United States Patent
Wilson

[11] Patent Number: 5,754,240
[45] Date of Patent: May 19, 1998

[54] METHOD AND APPARATUS FOR CALCULATING THE PIXEL VALUES OF A BLOCK FROM ONE OR TWO PREDICTION BLOCKS

[75] Inventor: William Brent Wilson, Singapore, Singapore

[73] Assignee: Matsushita Electric Industrial Co., Ltd., Osaka-fu, Japan

[21] Appl. No.: 724,674

[22] Filed: Oct. 1, 1996

[30] Foreign Application Priority Data

Oct. 4, 1995 [JP] Japan ............. 7-257732

[51] Int. Cl.$^6$ ........................................ H04N 07/36
[52] U.S. Cl. ............ 348/416; 348/402; 348/413; 348/443; 348/699
[58] Field of Search ............... 348/402, 413, 348/416, 443, 699

[56] References Cited

U.S. PATENT DOCUMENTS

| | | | |
|---|---|---|---|
| 4,862,259 | 8/1989 | Gillard et al. | 348/699 |
| 4,862,260 | 8/1989 | Harradine et al. | 348/699 |
| 4,862,267 | 8/1989 | Gillard et al. | 348/443 |
| 4,864,398 | 9/1989 | Avis et al. | 348/443 |
| 5,440,344 | 8/1995 | Asamura et al. | |
| 5,467,086 | 11/1995 | Jeong | |
| 5,475,501 | 12/1995 | Yagasaki | |
| 5,539,467 | 7/1996 | Song et al. | 348/402 |
| 5,541,661 | 7/1996 | Odaka et al. | 348/416 |
| 5,576,767 | 11/1996 | Lee et al. | 348/413 |
| 5,587,741 | 12/1996 | Kim | 348/699 |

FOREIGN PATENT DOCUMENTS

| | | |
|---|---|---|
| 7-154795 | 6/1995 | Japan |
| 7-203449 | 8/1995 | Japan |

OTHER PUBLICATIONS

English Language Abstract of JP 7-203449.
English Language Abstract of JP 7-154795.
International Organization for Standardization, "CD11172-Coding of Moving Pictures and Associated Audio for Digital Storage Media at up to about 1.5 Mbps," ISO MPEG Document, ISO-IEC/JTC1/SC2/WG11, 1993.
International Organization for Standardization, DIS13818-Generic Coding of Moving Pictures and Associated Audio, ISO MPEG Document, ISO-IEC/JTC1/SC2/WG11, 1994.
Araki et al., "Video DSP Architecture for MPEG2 CODEC," Proceedings of ICASSP-4, Apr. 1994.

*Primary Examiner*—Tommy P. Chin
*Assistant Examiner*—Frank Snow
*Attorney, Agent, or Firm*—Greenblum & Bernstein P.L.C.

[57] ABSTRACT

A method for calculating the pixel values of a sub-pixel accuracy motion compensated block of video pixels from one or two reference blocks, as is required in typical digital video compression and decompression systems uses a minimal amount of temporary storage memory resulting in a compact architecture suited for inexpensive consumer applications. This method utilizes a pixel pipeline within a block line pipeline to calculate the half pel accurate reference blocks and to average two blocks to result in a prediction block of pixels. The lines from each reference block are input to the invention alternately resulting in reduced memory requirements.

19 Claims, 7 Drawing Sheets

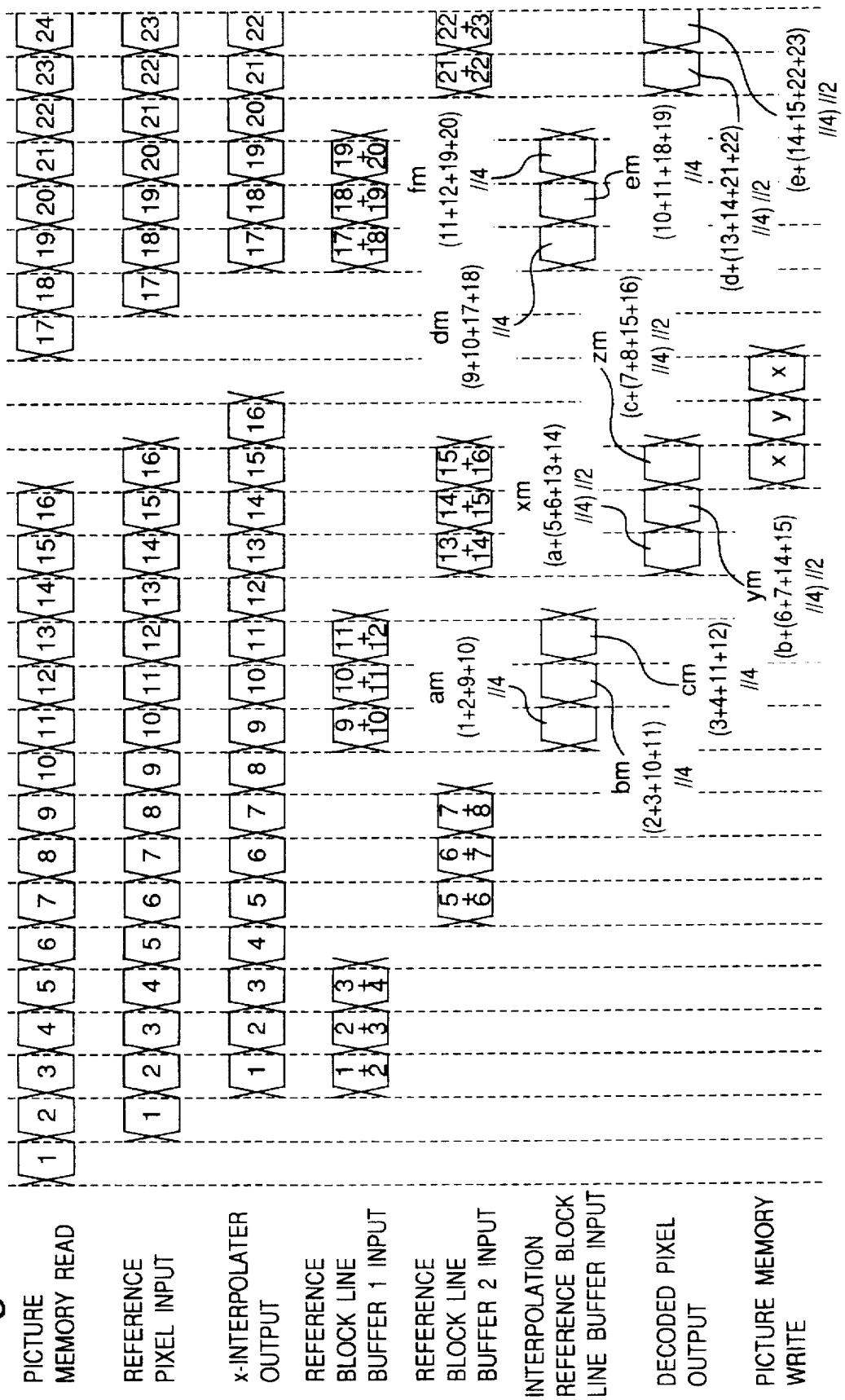

METHOD AND APPARATUS FOR CALCULATING THE PIXEL VALUES OF A BLOCK FROM ONE OR TWO PREDICTION BLOCKS

BACKGROUND OF THE INVENTION

1. Field of the Invention

The present invention relates to a digital video motion compensation method and apparatus used to calculate prediction blocks to half pel precision using both the forward and backward directions using minimal temporary storage requirements. This is especially applicable in digital video compression and decompression systems.

2. Description of the Prior Art

Many digital video processing systems utilize motion compensation techniques in which a previously processed picture or portion thereof is used for further processing of another picture. A typical example is the motion compensation techniques used by digital video compression and decompression processes in which groups of pixels from one picture are used to predict groups of pixels in other pictures. For example, MPEG-1 (see "CD11172—Coding of Moving Pictures and Associated Audio for Digital Storage Media at up to about 1.5 Mbps" by International Organization for Standardization, ISO MPEG Document, ISO-IEC/JTC1/SC2/WG11, 1993) and MPEG-2 (see "DIS/3818—Generic Coding of Moving Pictures and Associated Audio" by International Organization for Standardization, ISO MPEG Document, ISO-IEC/JTC1/SC2/WG11, 1994) utilize bidirectional half pel accuracy motion compensation. This entails dividing a picture up into groups of pixels called macroblocks which are predicted individually using motion vectors which refer to previously processed pictures located temporally before and after the picture being processed. The motion vectors supported by these standards are half-pixel precision which means that the prediction macroblocks pixels may have to be calculated as the average of two or four pixels. In addition, MPEG-2 supports several modes including field/frame motion compensation in which a macroblock can be predicted using previous frame or previous field data.

FIG. 2 shows how half-pixel precision is used to generate a prediction block. In this figure, the white circles represent full pixel precision pixels, the grey circles represent half pixel precision pixels calculated as the average of two white pixels in either the horizontal or vertical direction, and the black circles represent half pixel precision pixels calculated as the average of four white pixels. FIG. 3 shows how a block can be predicted using frame motion compensation by averaging two blocks from two reference pictures. The white ovals represent the pixels of the two references and the grey ovals represent the resulting predicted pixels calculated by averaging the white pixels. Note that each reference block may or may not have been determined using half pixel accuracy interpolation. FIG. 4 shows how a block can be predicted using field motion compensation by combining individual fields. Each frame comprises of two fields which can be separated, as shown by the white and light grey circles representing pixels of two fields of a picture frame. The reference fields can then be combined individually by averaging, and then the resulting prediction fields combined to make the predicted block. Again, note that each reference block (field) may or may not have been determined using half pixel accuracy interpolation.

The most obvious architecture to do this construction of a prediction block is shown by FIG. 5. In this figure, numeral 501 is the picture memory, 502 is the read block memory for reference 1, 503 is the read block memory for reference 2, 504 is the half-pixel interpolator, 505 is the reference block memory for reference 1, 506 is the reference block memory for reference 2, 507 is the reference averager, 508 is the prediction block memory, 509 is the IDCT (inverse discrete cosine transform) processor, 510 is the difference block memory, 511 is the reconstructer, and 512 is the decoded block memory. The full pixel reference blocks are read from the picture memory 501 into read block memories 502 and 503. The half-pixel interpolation is performed on each block by the half-pixel interpolator 504 and the resulting block is written into a reference block memory 505 and 506. Following this, the two references are combined by the reference averager 507 with the result being written into a prediction block memory 508. This prediction block is then combined using the reconstructer 511 with the contents of the difference block memory 510 and stored in the decoded block memory 512. Finally, the decoded block is written to the picture memory 501. The difference block memory 510 is filled by other decoding processes, in this case the IDCT processor 509. For MPEG1 and MPEG2, this is the inverse discrete cosine transform (IDCT) process.

The VDSP2 (see "Video DSP Architecture for MPEG2 CODEC", Araki et al., Proceedings of ICASSP-4, April 1994) reduces the memory requirements by performing the half pel interpolation as the reference block data is read with the result being placed in the reference block memory. It thus replaces the read block memories with a half-pel interpolation calculator. It also eliminates the decoded block memory by combining the difference block with the prediction block as the data is written to the picture memory. The block diagram showing the simplified VDSP2 architecture for this procedure is shown in FIG. 6. In this figure, numeral 601 is the picture memory, 602 is the half-pixel interpolator, 603 is the reference block memory for reference 1, 604 is the reference block memory for reference 2, 605 is the reference averager, 606 is the prediction block memory, 607 is the IDCT processor, 608 is the difference block memory, and 609 is the reconstructer. The full pixel reference blocks are read from the picture memory 501 and the half-pixel interpolation is performed on each block by the half-pixel interpolator 602 and the resulting block is written into a reference block memory 603 and 604. Following this, the two references are combined by the reference averager 605 with the result being written into a prediction block memory 606. This prediction block is then combined using the reconstructer 609 with the contents of the difference block memory 608 and written to the picture memory 601. The difference block memory 608 is filled by other decoding processes, in this case the IDCT processor 607.

Problems that the Invention is to Solve

An object of the invention is to reduce the amount of temporary storage required for reconstructing the decoded pixel data using motion compensated references. Digital video processors such as the MPEG1 and MPEG2 codecs are used in consumer electronic applications, so the cost of implementation is very important. The size of the implementation is directly proportional to cost in many cases. An object of the invention is to reduce the size of temporary storage required in order to reduce the cost of the implementation.

Means of Solving the Problems

For the purpose of solving the above-described problem, the present method for calculating the pixel values of a sub-pixel accuracy motion compensated block of video pixels from one or two reference blocks was invented. The invention comprises of transferring said reference block pixels to a calculator in an order in which the adjacent block lines of each block are consecutive, alternating between each reference block with each block line, and ordering the block lines of both blocks in the same relative order, and in which the adjacent pixels within each block line are consecutive. While this is occurring, said calculator calculates the predicted block and outputs the result as the data is calculated ordering the adjacent block lines of said predicted block consecutively in the same relative order as said reference read order for one of the reference blocks, wherein the adjacent pixels within each block line are ordered consecutively in the same relative order as said reference read order for one of the reference blocks. The calculator comprises of an x-interpolator for performing the sub-pixel interpolation between pixels of the same block line; two reference block line buffers for temporarily storing the block line from each reference block; a y-interpolator for performing the sub-pixel interpolation between pixels of consecutive block line; an interpolation reference block line buffer for temporarily storing the sub-pixel accuracy reference block line from the reference for which the first data originated; and a reference block averager for averaging the block line stored in said interpolation reference block line buffer with the interpolated reference block line of the subsequent reference block.

Operation of the Invention

The pixel data flow of the invention operates as a pixel pipeline within a block line pipeline. The data is read from the reference picture memories in the order that the calculations require the data. In this way, the pixels of a line of the block are interpolated using a single tap averaging filter as they are read and stored into the reference block line buffers. The line buffers act as the delay buffer in a 1 tap averaging filter for the block lines, in order to calculate the half pel interpolated block lines for each reference. The y-interpolator implements the computations for the averaging filter, with the result being a block line that has been averaged in two directions, which is the half pel accurate block line for the first reference. It is stored in the interpolation reference block line buffer. The next line to pass through the y-interpolator is from the second reference, if two references are used. This data corresponds to the half pel accurate block line for the second reference. The results of this calculation is sent to the reference block averager along with the pixel values corresponding to the half pel accurate block line for the first reference which are stored in the interpolation reference block line buffer. The result from the reference block averager is the bidirectional half pel accurate prediction block line which can be combined with the output of the IDCT and sent to the picture memory as a fully decoded block line.

DETAILED DESCRIPTION OF THE PREFERRED EMBODIMENTS

With reference to drawings, an embodiment for calculating the pixel values of a sub-pixel accuracy motion compensated block of video pixels from one or two reference blocks and combining it with pixel difference block values to result in decoded pixel values will be described.

Figure 1:
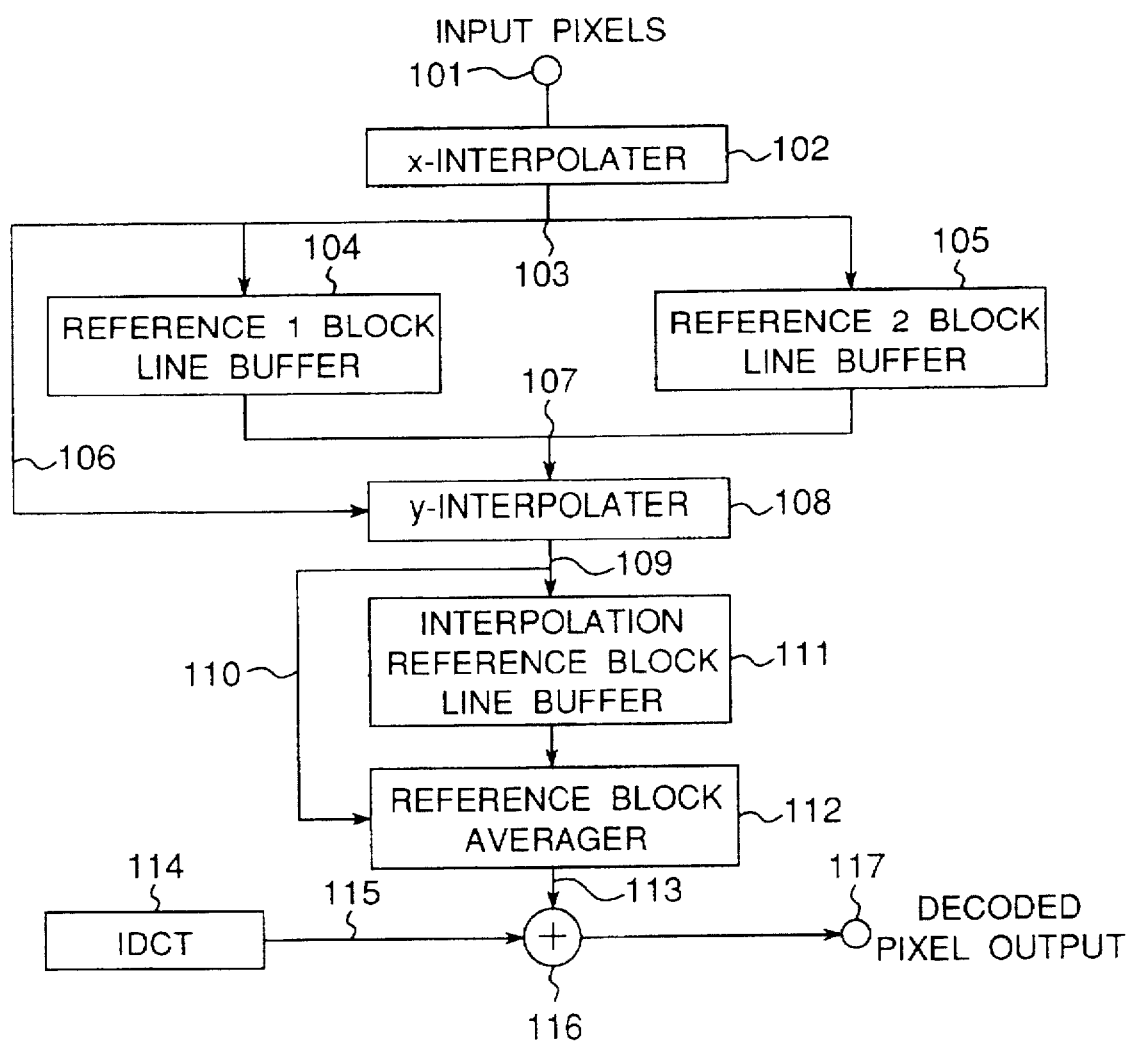
FIG. 1 is a block diagram showing one embodiment of the method according to the present invention.
Figure 2:
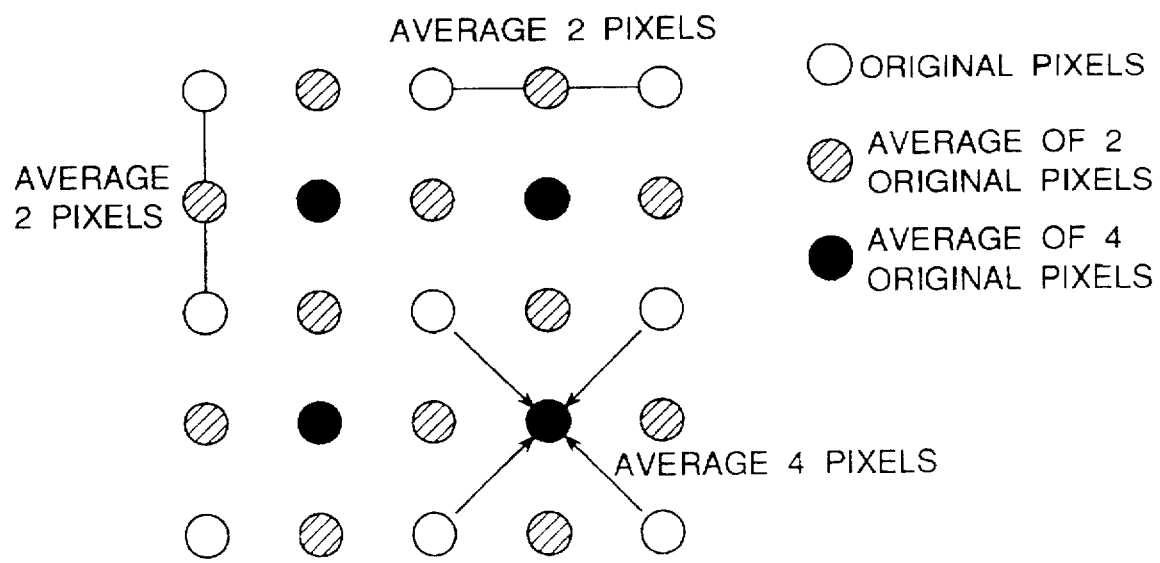
FIG. 2 is a diagram showing how half-pixel precision is used to generate a prediction block.
Figure 3:
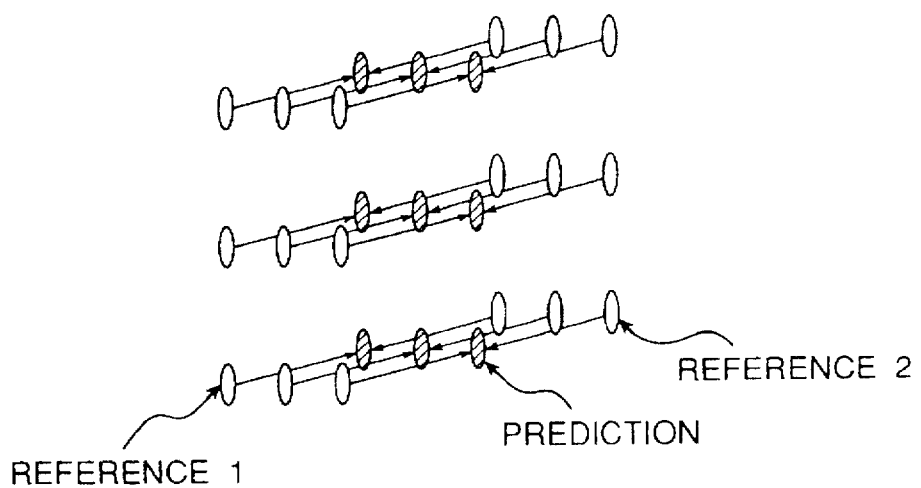
FIG. 3 is a diagram showing how a block can be predicted using frame motion compensation by averaging two blocks from two reference pictures.
Figure 4:
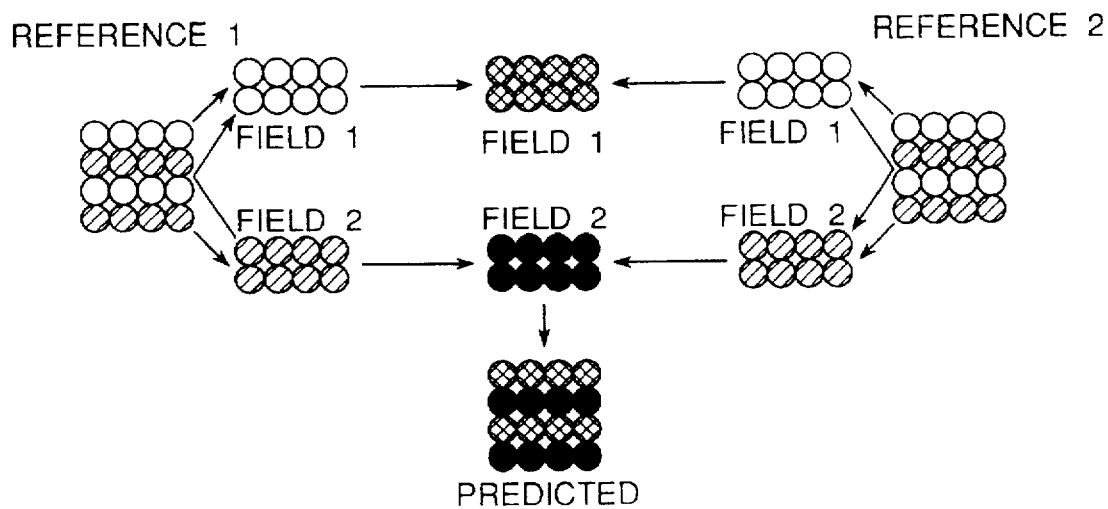
FIG. 4 is a diagram showing how a block can be predicted using field motion compensation by combining individual fields.
Figure 5:
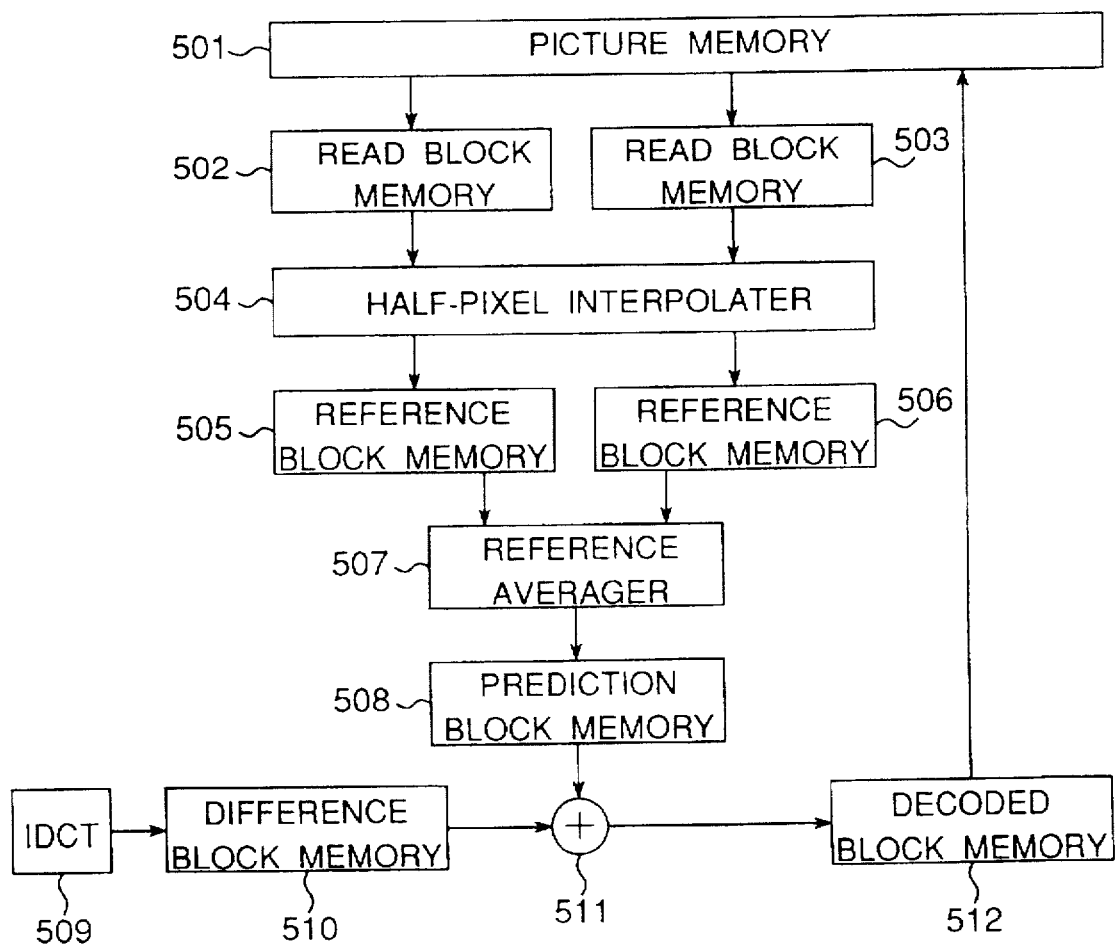
FIG. 5 is a block diagram showing one architecture for constructing the half-pixel precision prediction block from two references.
Figure 6:
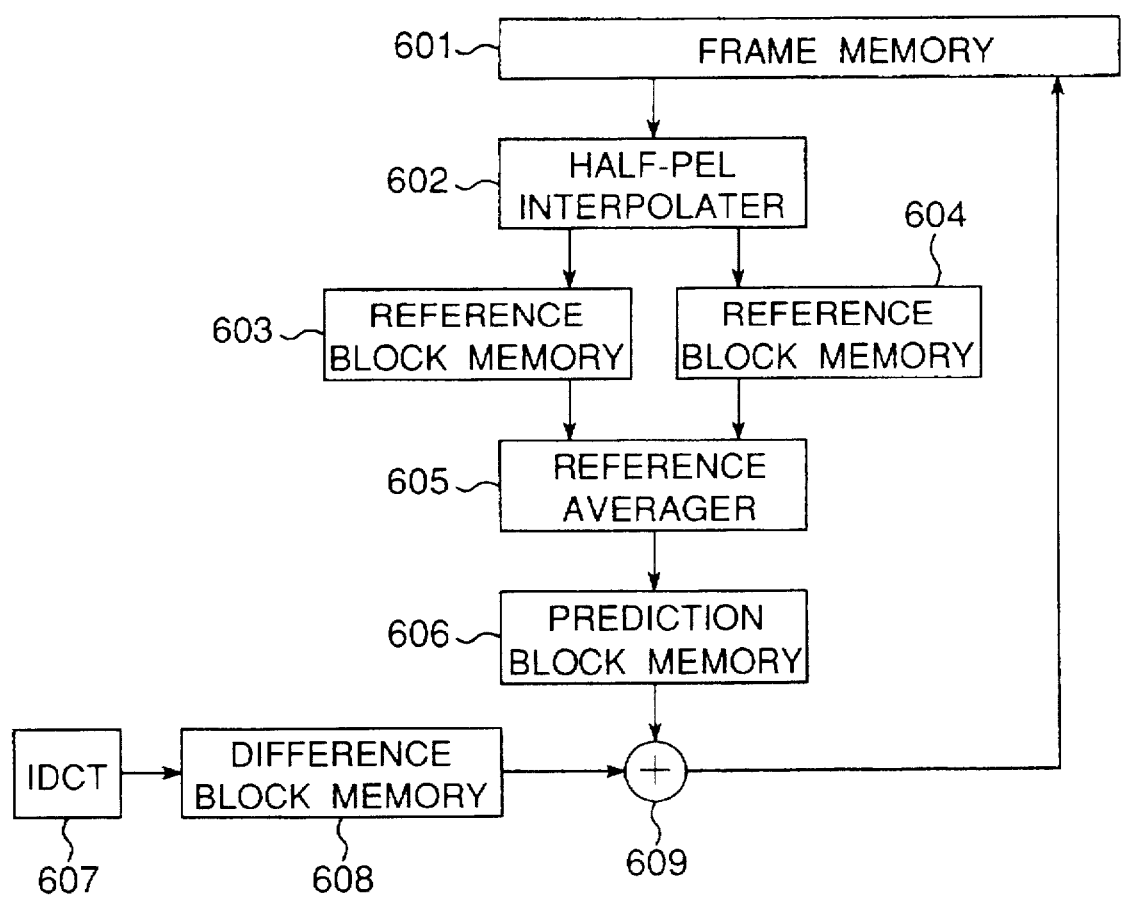
FIG. 6 shows the architecture used by the VDSP2 for constructing the half pixel precision prediction block from two references.

FIG. 1 shows an apparatus for calculating the pixel values of a block from one or two prediction blocks according to the present invention. In FIG. 1, numeral 101 is an input for the input pixels, 102 is an x-interpolator, 103 is an output of the x-interpolator 102, 104 is a reference 1 block line buffer, 105 is a reference 2 block line buffer, 106 is a bypass output of the x-interpolator, 107 is an input of the y-interpolator, 108 is a y-interpolator, 109 is an output of the y-interpolator, 110 is a bypass output of the y-interpolator, 111 is an interpolation reference block line buffer, 112 is a reference block averager, 113 is an output of the reference block averager, 114 is an IDCT processing block, 115 is an output of the IDCT processing block, 116 is a reconstructer, and 117 is an output for the decoded pixels after being processed by the invented method.

The embodiment of FIG. 1 operates as follows. The input pixels 101 are applied to an x-interpolator 102 which functions as a filter for calculating an interpolated pixel value using pixel values of the same reference block line. The resulting interpolated pixel values output from the x-interpolator 103 are stored in either the reference 1 block line buffer 104 or the reference 2 block line buffer 105 depending upon which reference the original pixels came from. These line buffers store the pixels corresponding to the x-interpolated input pixels for the reference blocks. The next line from the same reference is input to the input 101 and x-interpolated by the x-interpolator 102. As the results are output from the x-interpolator 103, they are simultaneously written to the respective reference block line buffer 104 or 105, and bypassed to the y-interpolator 108 using the bypass output of the x-interpolator 106. Simultaneously, the previous lines corresponding pixel value is read from the reference block line buffer and output 107 to the y-interpolator 108. In this way, the output 107 from the reference block line buffer 104 or 105 is applied to the y-interpolator 108 at the same time as the output from the x-interpolator 103 corresponding to the next reference block line is applied to the bypass output of the x-interpolator 106, and thus is input to the y-interpolator 108. The y-interpolator 108 functions as an interpolator for averaging the pixel values for a reference block line with the corresponding pixel values for the reference block line immediately before it. The output of the y-interpolator 109 is written into the interpolation reference block line buffer 111. It contains the result of the reference 1 half pixel accuracy reference block line as calculated by the use of the x-interpolator 102, the reference 1 block line buffer 104 and the y-interpolator 108. In a similar fashion, the reference 2 half pixel accuracy reference block line is calculated by the use of the x-interpolator 102, the reference 2 block line buffer 105 and the y-interpolator 108. When the output of the y-interpolator 109 is outputting the half pixel accuracy reference 2 block line, it is not written to the interpolation reference block line buffer 111, but instead this data is passed to the reference block averager 112 using the bypass output of the y-interpolator 110. Simultaneously, the corresponding pixel stored in the interpolation reference block line buffer 111 is passed to the reference block averager 112. The reference block averager 112 calculates the average of these pixel values and applies it's output 113 to the reconstructer 116. Simultaneously, the IDCT 114 applies it's corresponding pixel data to the reconstructer 116, with the output being the decoded pixel output 117.

Figure 8:
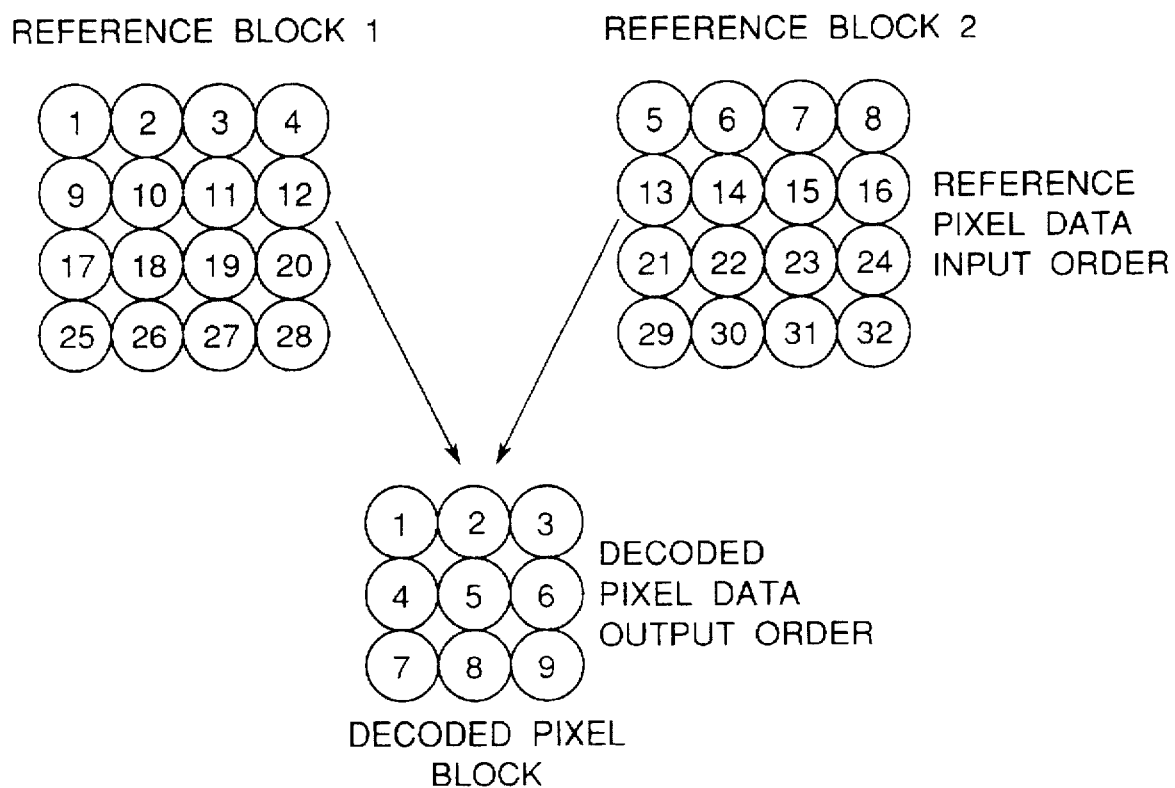
FIG. 8 describes an example of the input and output pixel timing necessary for the operation of the invented method and FIG. 9 describes the timing for the embodiment of FIG. 7 if the example input and output timing of FIG. 8 is used.

FIG. 8 describes an example of the input and output timing used by this embodiment to result in the required decoded pixel output data. This example shows two reference blocks where each is required to be half-pixel interpolated in both the horizontal and vertical directions before being averaged to form the decoded pixel block data. The desired half pixel values are located in the spaces between the circles representing the pixels. First the pixels of the top line of the reference block 1 are input, followed by the top line of the reference block 2, followed by the second line of reference block 1, and so on. Each line is input from the leftmost pixel of the reference block to the rightmost. The resulting decoded pixel data output order is a similar left-to-right, top-to bottom order.

As a further example, it is possible to apply the timing of FIG. 8 to the embodiment of FIG. 1, as an example of it's operation. The pixel 1 through 4 are applied successively to the x-interpolator 102, with the result being the average of 1 and 2, 2 and 3, and 3 and 4 written into the reference 1 block line buffer 104. Following this, the input pixels 5 through 8 are applied successively to the x-interpolator 102, with the result being the average of 5 and 6, 6 and 7, and 7 and 8 written into the reference 2 block line buffer 105. Next, the input and averaging of the 9 through 12 pixels are performed. The output from the x-interpolator for the average of 9 and 10 are applied to the y-interpolator 108 via the bypass output of the x-interpolator 106 at the same time as the average of pixels 1 and 2 are read from the reference 1 block line buffer 104 and applied to the y-interpolator 108. The y-interpolator 108 then calculates the average of these inputs resulting in the average of pixels 1, 2, 9 and 10. This corresponds to the half-pixel accuracy pixel values for reference block 1. The result of this calculation is written into the interpolation reference block line buffer 111 for each resulting calculated pixel value. Similarly the values of the half-pixel accuracy pixel values for reference block 2 are calculated, but in this case, as they are calculated they are not written into the interpolation reference block line buffer 111. Instead they bypass is using the bypass output of the y-interpolator 110. In this way the contents of the interpolation reference block line buffer 111 can be averaged with the output of the y-interpolator 108. Thus, the average of pixels 1, 2, 9 and 10 can be averaged by the reference block averager 112 with the average of pixels 5, 6, 13 and 14 resulting in a half pixel accurate prediction pixel formed from two references. This result can be added to the corresponding pixel from the IDCT processor 114 using the reconstructer 116. This results in the decoded pixel number 1 in the decoded pixel block shown in FIG. 8. Similarly, all the pixels of this block can be calculated.

Figure 7:
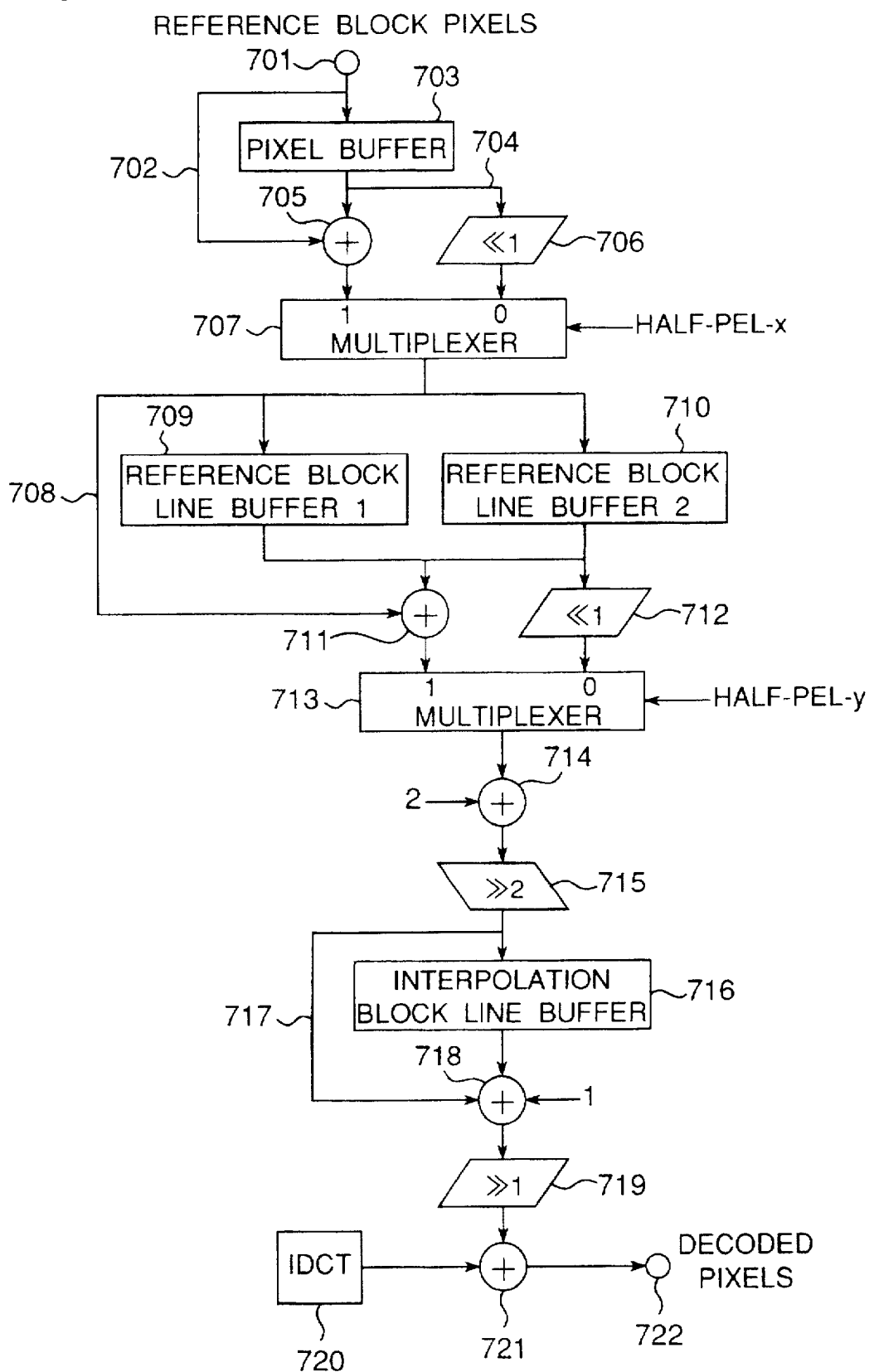
FIG. 7 describes an embodiment of the invented method.

FIG. 7 describes another embodiment for the invented method. In this figure, numeral 701 is an input for the reference block pixels, 702 is a pixel buffer bypass, 703 is a pixel buffer, 704 is an x-leftshifter input, 705 is an x-adder, 706 is an x-leftshifter, 707 is a x-multiplexer, 708 is a reference block line buffer bypass, 709 is a reference block line buffer 1, 710 is a reference block line buffer 2, 711 is a y-adder 712 is a y-leftshifter, 713 is a y-multiplexer, 714 is an xy-adder, 715 is an xy-rightshifter, 716 is an interpolation block line buffer, 717 is an interpolation block line buffer bypass, 718 is a reference adder, 719 is a reference-rightshifter, 720 is an IDCT processor, 721 is a reconstructer adder, and 722 is a decoded pixel output.

This embodiment can be implemented as a synchronous machine using latches clocked with a common clock and combinational logic for processing and control between the latches. For this embodiment, the reference block pixels are input to the input 701 using the same cycle as the clocks for the latches. The pixel buffer 703 can be implemented as a latch. The reference block line buffers 709 and 710, and the interpolation block line buffer 716 are implemented as a group of N latches, where N is the number of pixels in each block line. The other blocks in the diagram can be implemented using combinational logic. However the IDCT may be implemented using a synchronous circuit. For this embodiment, the x-adder 705 is a simple adder, the x-leftshifter is a bit shifter for multiplying the binary pixel value by 2. The combination of pixel buffer 703, pixel buffer bypass 702 and x-adder 705 comprise an averaging circuit for horizontal averaging of the input pixel data. The output is equal to twice the average of the pixels averaged. The x-multiplexer 707 is used to select the output of the x-adder 705 or the output of the x-leftshifter 706 based on the half-pel-x value. The half-pel-x can be either 0, indicating that no half-pixel precision interpolation is required in the x-direction (horizontal), or 1 indicating that interpolation is required. The output of the x-multiplexer 707 is stored in the reference block line buffers 709 and 710. These buffers comprise of latches which act as synchronous FIFOs. The outputs of the x-multiplexer 707 which originates from input reference block 1 are written to Reference block line buffer 1 709 while the outputs which originate from input reference block 2 are written to Reference block line buffer 2 710. The y-adder 711 is a simple adder, and the y-leftshifter 712 is a bit shifter for multiplying the pixel value by 2. The combination of reference block line buffer 709 or 710, reference block line buffer bypass 708, and y-adder 711 comprise an averaging circuit for vertical averaging of the input pixel data. The output is equal to twice the average of the pixels averaged. The y-multiplexer 713 is used to select the output of the y-adder 711 or the output of the y-leftshifter 712 based on the half-pel-y value. The half-pel-x can be either 0, indicating that no half-pixel precision interpolation is required in the y-direction (vertical), or 1 indicating that interpolation is required. The output from the y-multiplexer 713 is applied to the xy-adder 714, which simply adds 2 to the input. This result is shifted 2 bits to the right by the xy-rightshifter 715. The combination of the xy-adder and xy-rightshifter results in a divide by 4 with rounding up to the nearest integer result. This result is the half-pixel precision reference pixel from reference 1 or 2. If this result comes from reference 1 pixels, it is written into the interpolation block line buffer 716. If it is from reference 2, it is applied to the input of the reference adder 718, which adds it's inputs plus an additional 1. In other words, the half pixel accurate prediction pixel for reference 2 is added to the corresponding half pixel accurate prediction pixel for reference 1 which is stored in the interpolation block line buffer 716. The output of the reference adder 718 is shifted right by 1 position by the reference rightshifter 719. The combination of the reference adder, 718 and the reference rightshifter 719 is a circuit for dividing the sum of the two inputs by 2 with rounding up to the nearest integer. The output is therefore the result of averaging the half pixel accurate prediction pixels from both reference 1 and 2. The corresponding difference pixel value is generated by the IDCT processor 720 and added to the output of the reference rightshifter 719 using the reconstructer adder 721. The result is a decoded pixel value at the output 720.

This embodiment can be, but is not limited for use in a video processing system where the reference block pixels which are input 701 come from a picture memory, and the resulting decoded pixels output 722 are written to the same memory.

An example of the input and output timing for the pixel data is shown in FIG. 8. The resulting timing for this embodiment using this pixel data timing is shown by FIG. 9. For this example, the picture memory is read one clock before the reference pixel input. This would correspond to a latch between the picture memory and the reference pixel input 701. The numbers in FIG. 9 refer to pixels as described in FIG. 8. From FIG. 9 it can be seen that the input to the reference block line buffer 1 consists of the sum of pixels 1 and 2 when the pixel 2 value is applied to the reference pixel input 701. Similarly, the sums of pixels 2 and 3, 3 and 4, 5 and 6, 6 and 7, and 8 and 9 are calculated and applied to the inputs of the reference block line buffers 1 and 2 709 and 710. The input to the interpolation block line buffer 716 is the sum of the reference pixel input, x-interpolator output, and reference block line buffer 1 input, all divided by four. This corresponds to the reference 1 half pixel accurate values. These are averaged with the reference 2 half pixel accurate values, and added to the IDCT difference values to result in the decoded pixel values called x, y and z in FIG. 9. These can be written to the same picture memory as the input data originates from by delaying it slightly so that after pixel 16 is read from memory, data z can be written. This additional delay on the decoded delay is easily implemented using latches.

Note that it is possible to change the timing of FIG. 9. The timing of the memory read and write timing can be changed, and additional latches can be added to the embodiment of FIG. 7 in order to reduce the amount of combinational logic that signals must propagate through between latches. In addition, the embodiment describes the x-direction to be synonymous with horizontal, and y-direction as synonymous with vertical, but these can be reversed. The results will be similar. In addition, the use of half-pixel accuracy interpolation in the embodiments can be changed to quarter-pixel or better accuracy by increasing the number of taps on the x and y interpolators.

The number of pixels in each line and the number of lines in each block of pixels is not limited to the examples described by these embodiments. The example of the timing described by FIGS. 8 and 9 show how half pixel interpolation can be done in both the horizontal and vertical directions. The embodiments described can also be used when full pixel accuracy is required for horizontal, or vertical or neither directions. This was described in the embodiment for the use of the x-leftshifter and y-leftshifter. The number of reference pixels in a block reference depends upon the need for half pixel interpolation. If half pixel interpolation is required, the reference block must have one extra pixel in the direction of interpolation, as in the example described by FIG. 8. More pixels are needed in the case of higher precision interpolation. In this example, a 4×4 pixel reference block is interpolated to make a 3×3 prediction block.

The advantage of this invention is to reduce the required temporary storage memories to as few as 3 block line memories (two reference block line buffers and the interpolation reference block line buffer) plus a pixel buffer inside the x-interpolator. This is much less than the temporary memory storage requirements of the examples described in the prior art. The result will be much cheaper implementations of the motion compensation circuitry used in consumer electronics products which require this function. The reason the memory can be reduced so much is due to the use of a pipeline within a pipeline which allows the calculation of x-interpolated half pel precision values to be performed at the same time as y-interpolated half pel precision values, which can be performed at the same time as the two references are interpolated. This invention minimizes the time for which a pixel must be delayed in order to calculate the prediction pixels, thus eliminating the need for additional memory storage devices.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for calculating pixel values of a sub-pixel accuracy motion compensated block of video pixels from a plurality of reference blocks and combining said motion compensated block with pixel difference block values to result in decoded pixel values, said method comprising:

transferring pixels of said plurality of reference blocks in a reference read order to a calculator, wherein said reference read order comprises:
  ordering adjacent block lines of each of said reference blocks consecutively;
  alternating between each reference block on a block line-by-block line basis;
  ordering block lines of said plurality of reference blocks in the same relative order;
  ordering adjacent pixels within each block line consecutively; and
  ordering pixels of said plurality of reference blocks in the same relative order;

calculating the predicted block using said calculator;
outputting said predicted block in a predicted block write order to a reconstructer; and
combining said predicted block with said pixel difference block.

2. The method according to claim 1, wherein said transferring occurs only once when calculating said predicted block by said calculator.

3. A method according to claim 1, wherein said predicted block write order comprises the steps of:
  ordering the adjacent block lines of said predicted block consecutively in the same relative order as said reference read order for one of the reference blocks; and
  ordering the adjacent pixels within each block line consecutively in the same relative order as said reference read order for one of the reference blocks.

4. A method according to claim 1 wherein, said calculator comprises:
  an x-interpolator for performing the sub-pixel interpolation between pixels of the same block time;
  two reference block line buffers for temporarily storing the block line from each reference block;

a y-interpolator for performing the sub-pixel interpolation between pixels of consecutive block lines;

an interpolation reference block line buffer for temporarily storing the sub-pixel accuracy reference block line from the reference for which the first data originated;

a reference block averager for averaging the block line stored in said interpolation reference block line buffer with the interpolated reference block line of the subsequent reference block.

5. A method according to claim 4, wherein said x-interpolator comprises:

an x-pixel buffer for temporarily storing and delaying the input pixel data;

an x-adder for adding the input pixel data with the delayed pixel data from said x-pixel buffer;

an x-multiplier for multiplying the input pixel data by two; and an x-multiplexer for selecting the result of said x-interpolator from either the output of said x-adder when sub-pixel interpolation between pixels of the same block line is required, or the output of said x-multiplier when sub-pixel interpolation between pixels of the same block line is not required.

6. A method according to claim 5, wherein said x-multiplier comprises:

a shifter for shifting said input pixel data one bit position left, resulting in a multiplication by a factor of two.

7. A method according to claim 4, wherein said reference block line buffer comprises:

the same number of pixel buffers as there are pixels in a block line.

8. A method according to claim 4, wherein said y-interpolator comprises:

a y-adder for adding the input block line pixel data with the delayed block line pixel data from said reference block line buffer, wherein the source of the y-adder inputs originate from the same reference block;

a y-multiplier for multiplying the input block line pixel data by two;

a y-multiplexer for selecting the result of said y-interpolator from the output of said y-adder when sub-pixel interpolation between pixels of consecutive block lines is required, and from the output of said y-multiplier when sub-pixel interpolation between pixels of consecutive block lines is not required; and a y-divider for dividing the output from the y-adder by 4, resulting in the output of said y-interpolator.

9. A method according to claim 8, wherein said y-multiplier comprises:

a shifter for shifting said input block line pixel data one bit position left, resulting in a multiplication by a factor of two.

10. A method according to claim 8, wherein said y-divider comprises:

a y-2adder for adding two to the output of the y-multiplexer; and a y-4divider for dividing the output from the y-2adder by four with truncation.

11. A method according to claim 10, wherein said y-4divider comprises:

a shifter for shifting said output from the y-2adder right by two bit positions resulting in a division by four with truncation.

12. A method according to claim 4, wherein said interpolation reference block line buffer comprises:

the same number of pixel buffers as there are pixels in a block line.

13. A method according to claim 4, wherein said reference block averager comprises:

an averaging adder for adding one to the sum of the input to said interpolation reference block line buffer and the delayed output of said interpolation reference block line buffer; and an averaging divider for dividing the output of said averaging adder by two with truncation.

14. A method according to claim 13, wherein said averaging divider comprises:

a shifter for shifting said output of said averaging adder right by one bit position resulting in a division by two with truncation.

15. A method according to claim 1, wherein said pixel difference block comprises:

data resulting from an inverse discrete cosine transform operation.

16. A method according to claim 1, wherein said reconstructer comprises:

an adder.

17. An apparatus for calculating pixel values of a sub-pixel accuracy motion compensated block of video pixels from a plurality of reference blocks and combining said motion compensated block with pixel difference block values to result in decoded pixel values, said apparatus comprising:

means for transferring pixels of said plurality of reference blocks in a reference read order to a calculator, said transferring means comprising:

means for ordering adjacent block lines of each of said reference blocks consecutively, for alternating between each reference block on a block line-by-block line basis, and for ordering block lines of said plurality of reference blocks in the same relative order; and means for ordering adjacent pixels within each block line consecutively and for ordering pixels of said plurality of reference blocks in the same relative order;

means for calculating the predicted block using said calculator;

means for outputting said predicted block in a predicted block write order to a reconstructer; and means for combining said predicted block with said pixel difference block using said reconstructer.

18. The apparatus according to claim 17, wherein said transferring means transfers said plurality of reference block pixel values only once as said calculating means calculates said predicted block.

19. The apparatus according to claim 17, wherein said transferring means comprises a reference block one line buffer, a reference block two line buffer, and an interpolation reference block line buffer.

* * * * *